United States Patent [19]
Wohlgemuth

[11] Patent Number: 5,776,518
[45] Date of Patent: Jul. 7, 1998

[54] BOTTLE MOLD AND ADJUSTABLE TOP BLOCK ASSEMBLY AND TOP BLOCK ALIGNMENT MEMBERS

[75] Inventor: Emanuel E. Wohlgemuth, North Bellmore, N.Y.

[73] Assignee: Ultraseal Technologies Corporation, Worcester, Mass.

[21] Appl. No.: 748,431

[22] Filed: Nov. 13, 1996

Related U.S. Application Data

[63] Continuation-in-part of Ser. No. 491,552, May 16, 1995, Pat. No. 5,589,204.

[51] Int. Cl.[6] .................................................. B29C 49/76
[52] U.S. Cl. .......................... 425/182; 249/158; 264/533; 425/525
[58] Field of Search ............................ 425/182, 185, 425/190, 191, 192 R, 195, 522, 525, 533, 527, 541; 249/102, 103, 155, 158, 159; 264/533

[56] References Cited

U.S. PATENT DOCUMENTS

| | | | |
|---|---|---|---|
| 3,264,684 | 8/1966 | Moslo | 425/525 |
| 3,354,509 | 11/1967 | Ammondson | 425/541 X |
| 3,717,430 | 2/1973 | Hansen | 425/525 X |
| 3,868,202 | 2/1975 | Valyi | 425/533 X |
| 3,892,829 | 7/1975 | Uhlig | 425/525 X |
| 3,941,539 | 3/1976 | Saumsiegle et al. | 425/525 |
| 4,076,484 | 2/1978 | Armour et al. | 425/525 |
| 4,254,933 | 3/1981 | Netto | 249/103 |
| 4,285,658 | 8/1981 | Bohart et al. | 425/525 X |
| 4,299,371 | 11/1981 | Duga | 425/525 X |
| 4,352,652 | 10/1982 | Barber | 425/533 X |
| 4,382,769 | 5/1983 | Younkin et al. | 264/533 X |
| 4,832,592 | 5/1989 | Saumsiegle | 425/525 |
| 4,871,492 | 10/1989 | Spoetzl | 425/525 X |
| 5,049,224 | 9/1991 | Umezawa et al. | 425/525 X |
| 5,332,384 | 7/1994 | Abramat | 425/541 X |
| 5,474,438 | 12/1995 | Walker, Jr. | 425/185 |
| 5,585,121 | 12/1996 | Morris | 425/525 X |
| 5,589,204 | 12/1996 | Wohlgemuth | 425/182 |
| 5,629,032 | 5/1997 | Pennino | 425/525 X |

*Primary Examiner*—Richard L. Chiesa
*Attorney, Agent, or Firm*—Hoffmann & Baron, LLP

[57] ABSTRACT

A mold assembly is provided for use in the blow molding of plastic containers such as those used for containing milk or water. The assembly includes a pair of main mold bodies, each having a cavity which is used for forming the main body of the container. A top block assembly is removably mounted to each main mold body. Each top block assembly includes a top block body, a neck finish insert, a shear steel and a master seal. A rotatable cam is operatively associated with the top block assembly. Rotation of the cam causes a front face of the top block assembly to be moved with respect to the front face of the main mold body with which it is associated. Each top block body further includes alignment members, such as alignment pins and/or bushings, for ensuring proper alignment of the top block assemblies along the parting plane of the mold. The alignment members are preferably located at the tonnage pad sections of the top block bodies.

23 Claims, 15 Drawing Sheets

BOTTLE MOLD AND ADJUSTABLE TOP BLOCK ASSEMBLY AND TOP BLOCK ALIGNMENT MEMBERS

CROSS REFERENCE TO RELATED APPLICATION

This application is a continuation-in-part of Ser. No. 08/491,552 filed May 16, 1995, now U.S. Pat. No. 5,589,204.

FIELD OF THE INVENTION

This invention relates to a top block assembly for a container blow-mold system which facilitates proper alignment of the top block and the main mold, and a method for adjusting the top block assembly with respect to the main mold to achieve such alignment.

BACKGROUND OF THE INVENTION

The blow-molding of plastic containers is well known and practiced worldwide. Blow-molding offers many advantages over other forms of container manufacturing.

Among these advantages are: the ability to produce containers at minimal cost and with minimal waste; the low start-up costs and mold making lead times in comparison to other manufacturing methods such as injection molding; the ability to produce irregular shaped and hollow containers; the ability to produce containers quickly and automatically; the ability to produce containers from a variety of materials having qualities suited to the specific application. No other type of plastic processing offers the versatility, economy, and speed of blow-molding for producing plastic containers.

Blow-molds for producing such containers are commonly made of aluminum. Aluminum offers several advantages. Among those are: ease and economy of mold manufacture; light weight; efficient heat transfer. Because the process pressures and clamping forces during blow-molding are relatively low, and mold erosion from the flow of molten plastic is not a factor, aluminum is amply strong and wear resistant for blow-molding, whereas other processes, such as injection molding, require the use of hardened steel. The relative softness of aluminum does however subject the mold to damage, such as during maintenance, and wear, such as when the mold halves do not correctly mate and cooperate. These factors, combined with the high production rates common to blow-molding, lead to the need for regular maintenance on and restoration of the aluminum molds. For instance, the matching parting faces of the mold halves must often be repaired or refaced. This refacing usually results in a reduction of the overall depth of the mold, measured from the back side of one mold half to the back side of the other across the parting face. Although a standard mold half depth of four and three-quarters inches is normally provided on new molds, that dimension is reduced with each such refacing.

Blow-molded containers having specially formed neck finishes are commonly employed for use with container closures. Neck finishes may be threaded for use with threaded closures, adapted for mating with snap-on closures, etc. It is common within a container blow-mold system to employ a main mold to form the container reservoir, and a neck block, or top block, to form the neck finish. Top blocks are also made to standard dimensions so that the parting face of the top block and main mold properly match. The main mold is usually adapted to interchangeably accept any standard top block for a particular container size or style.

Top blocks and main molds are generally aligned visually by being loosely engaged, tapped into alignment such as with a mallet, then firmly affixed together. The back side of each mold half, and the back side, or heel, of each top block, are affixed to a planar mounting or back plate. Such tapping and rigid engagement, usually by steel bolts driven into threaded holes in the main mold, may cause damage and wear to the mold system, particularly when performed repeatedly as is common. Provided that the depth of the main mold half, from its parting face to its back side, is exactly equal to the depth of the top block half, from its parting face to its heel, the mold system can be properly aligned and effective molding can be performed therein. However, even though the top blocks and main molds are originally made to standard dimensions, extremely tight dimensional tolerances must be expensively met to prevent mismatching of the parting faces. When making a new mold system, it is more often economically advantageous to kit or match machine the mold halves to the top block halves to increase the likelihood of an acceptable parting line match.

The first pair of components mounted to the top block are the neck finish blocks. Each neck finish block is usually made of aluminum, and may originally be formed as a circular body. The circular body is cut in half to form the neck finish block for each half of the mold. The neck finish blocks are machined to provide threads, ratchet teeth, shoulders or other surface features on the container which are used to engage or otherwise accommodate a closure.

During blow-molding, a parison of molten plastic is extruded between the open mold halves, then the mold system closes to entrap the parison within the mold cavity. A hollow blow pin is inserted through the neck opening, and into the parison where it inflates the parison with pressurized air to cause the parison to form to the shape of the container and neck finish cavity. The blow pin includes a hardened steel bushing, or shear bushing, having an annular blade, and each top block half includes a semi-circular hardened steel blade, or shear steel.

The shear steel shapes and trims flash from the top end of the bottle neck. By providing various degrees of precision ground undercut to the bottom surfaces of the shear steels, a distinct radius can be formed at the upper edge of the bottle neck area. This can improve the strength of the bottle neck in this critical area. Shear steels are made of precision ground and hardened steel.

When the mold is closed, the semi-circular blades and seals form annular orifices around the shear bushing. During molding, portions of the parison extending beyond the mold cavity are trapped between the parting faces of the mold halves and become unwanted flash. After the container is formed within the cavity and before the mold system reopens to release the blow-molded container, the shear bushing is retracted through the shear steel orifice. The shear bushing and shear steels are sized and shaped so that the retraction causes a shearing of the container opening through the neck, whose diameter is that of the shear bushing blade and shear steel orifice. After the molded container is removed from the mold, flash is removed by trimming in an automated process.

The last set of components which are mounted to the top block are the master seals, which are sometimes referred to as masters. These components provide a seal for the blow pin, thereby preventing air from escaping from the mold when the parison is inflated to form the container. They also form a "flash pocket" which pinches and seals the parison when the molds close at the start of the production cycle.

When all neck finish components, i.e. the neck finish block, the shear steel and the master seal, have been mounted to the top block halves, they are then secured thereto with four Allen cap screws. All neck finish components are aligned as closely as possible with the mold parting line. Failure to do so can prevent the mold from closing properly, leading to damage or even destruction of the neck finish components and/or blow pin.

Misalignment of the main mold and top block parting faces can result in other problems during attempted molding. In addition to damaging the neck finish component, unusual and hastened wear of the parting faces, excessive and untrimmable molding flash, concentrated and extreme pressures on areas of the mold and improper shearing of the container opening may occur.

The neck finish components are often the most detailed components of the mold system, having many features and requiring the highest degree of accuracy in manufacture. For instance, the mating halves of threaded neck finish blocks must match precisely and prevent mold flash to ensure that the container closure will properly fit onto the neck and seal the container opening. Interchangeable mold inserts are commonly employed within the top blocks to simplify and reduce the cost and time of making changes to the neck finish type. As a result, it is not so common to recondition or repair the top block itself as it is to recondition or repair a main mold which generally includes an integral cavity. This fact creates a problem and burden when main mold reconditioning or repair is required. Because the main mold depth will be reduced by such maintenance, the top block must also be reworked only to maintain an equal depth as the main mold, for proper alignment thereafter, or else a relief pocket must be precisely cut into the back plate to accommodate the new position of the top block's tail end. This is a costly and time consuming process.

SUMMARY AND OBJECTS OF THE INVENTION

It is an object of the present invention to eliminate the need for precise sizing of the top block depth to match the main mold depth.

It is another object of the present invention to eliminate the need for top block reworking when the main mold is reworked.

It is another object of the present invention to eliminate the need for relieving the back plate when the main mold is reworked.

It is another object of the present invention to improve the accuracy and reduce the time and complexity of parting face alignment both during initial mold set-up and after mold rework.

It is another object of the present invention to extend mold system life by reducing the damage and wear caused by the old alignment method.

In accordance with the above objects of the invention, a top block assembly is provided which allows alignment of the parting faces of the top block and/or neck finish components thereof with the parting face of the main mold. A method of providing such alignment is also provided.

A top block assembly according to the invention includes a top block including a neck finish portion and a rotatable cam which bears against a surface of the top block. The cam preferably bears against the rear surface of the top block. It may alternatively bear against the neck finish portion. The top block assembly is mountable to a main mold. By rotating the cam, a front surface of the top block can be aligned a front surface of the main mold.

In accordance with a second embodiment of the invention, a top block assembly is provided which includes a pair of top block bodies, and alignment means in the front face of each top block body for preventing shifting of the top block bodies along a parting plane therebetween. Such alignment means are preferably in the form of alignment pins and bushings.

A method is provided for aligning a surface of a top block with a front surface of a main mold. The method includes the steps of providing an assembly including a main mold, a top block assembly mounted to the main mold, and moving means operatively associated with the top block, and causing said moving means to move a front surface of the top block assembly into alignment with a front surface of the main mold. The moving means is preferably in the form of a rotatable cam.

DESCRIPTION OF THE PREFERRED EMBODIMENTS OF THE INVENTION

Figure 1:
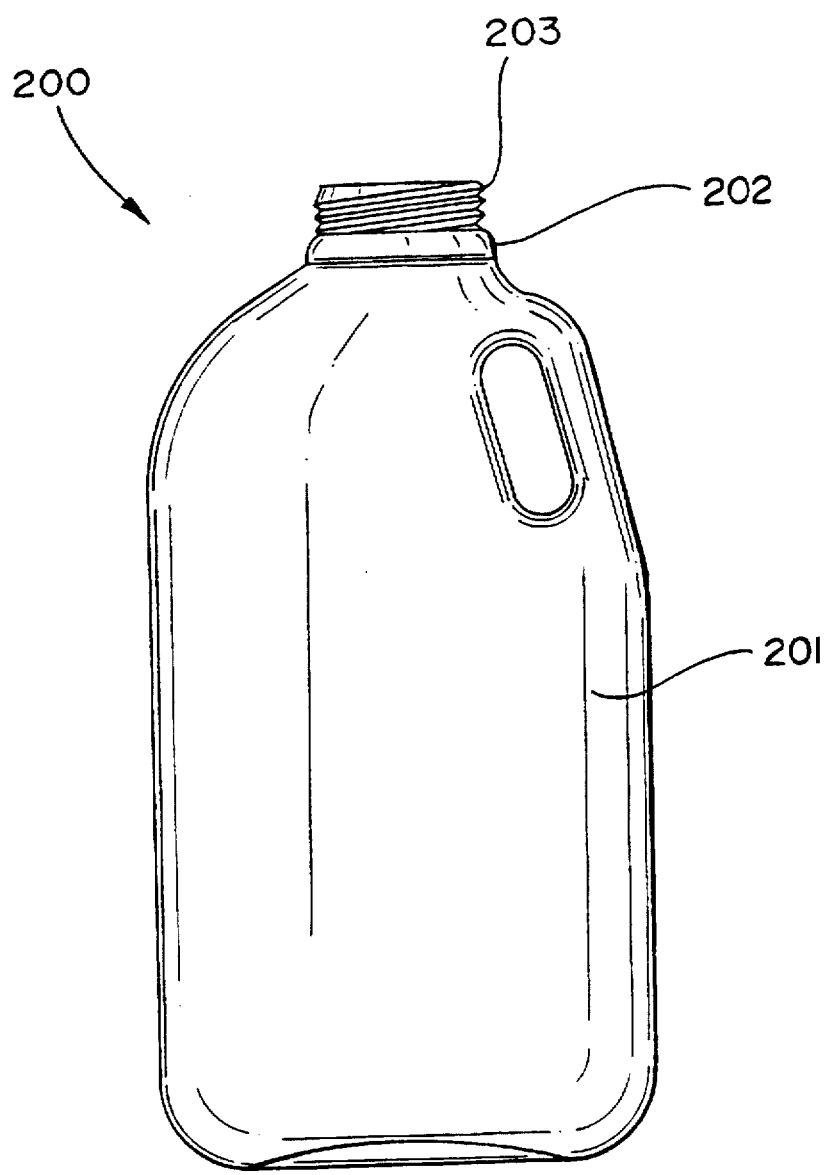
FIG. 1 is a front view of a typical prior art blow-molded container applicable to the present invention.
Figure 2:
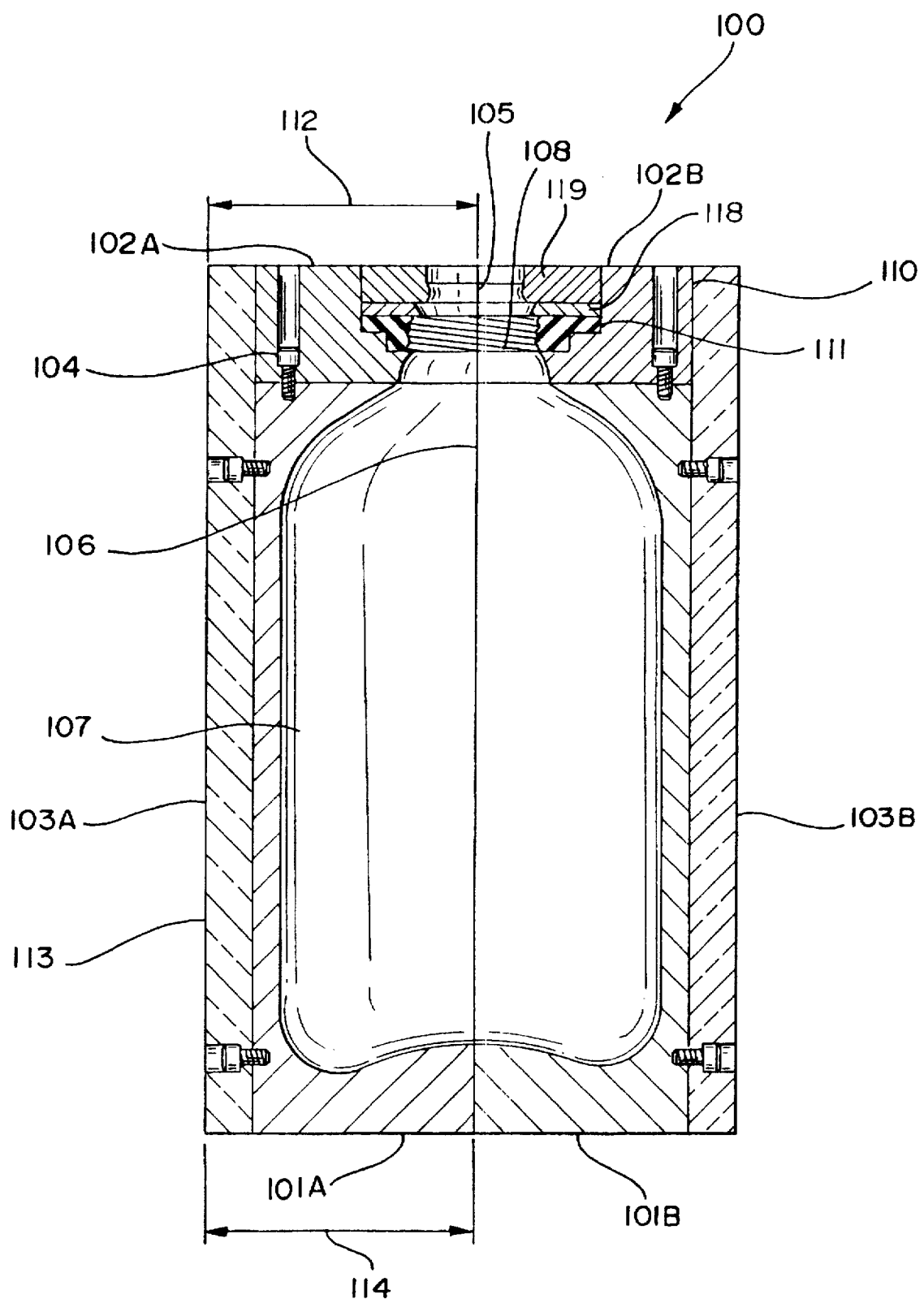
FIG. 2 is a cross-sectional side view of a typical prior art blow-mold system applicable to the present invention.
Figure 3:
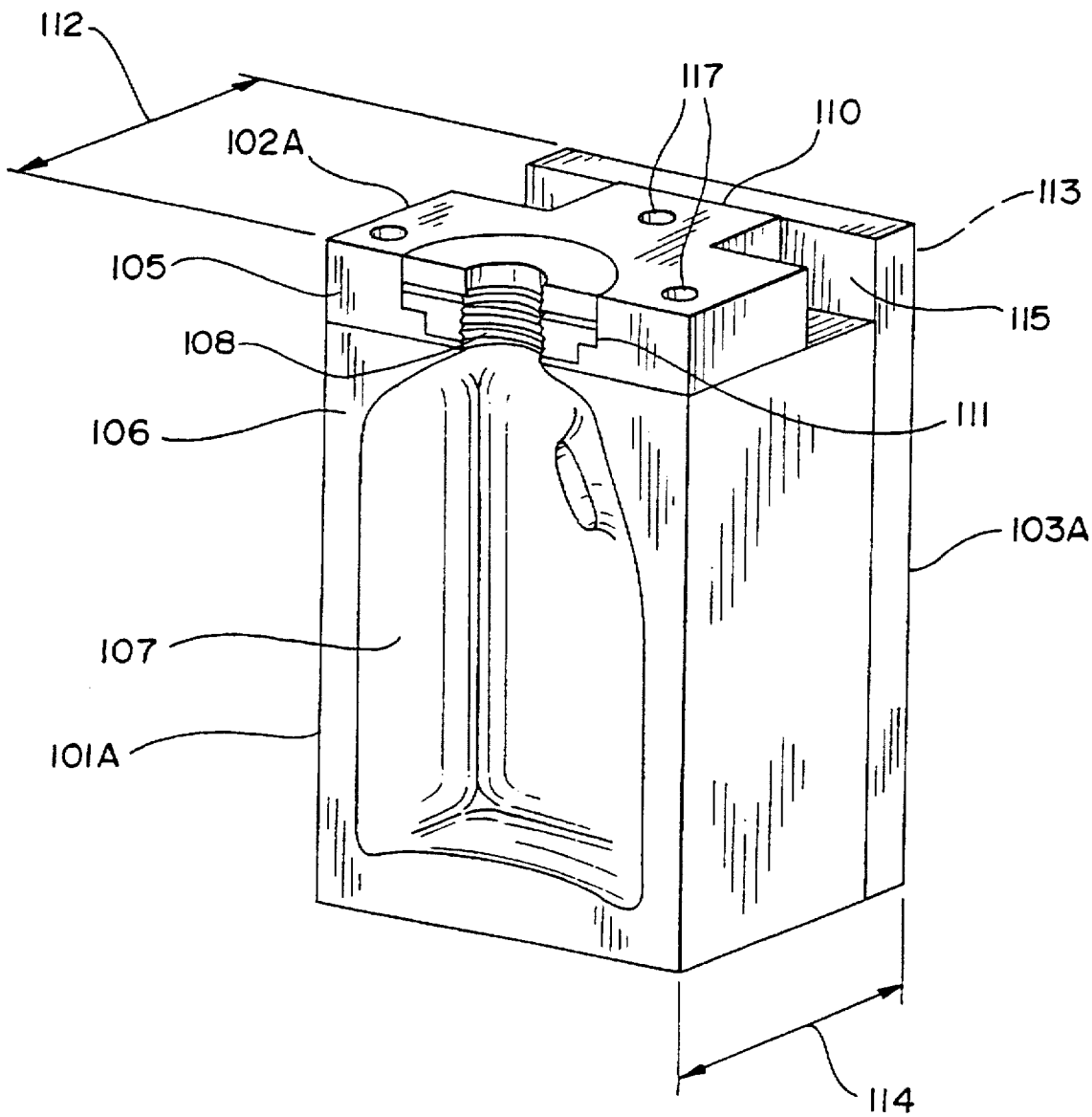
FIG. 3 is a partial perspective view of the blow-mold system of FIG. 2.
Figure 4:
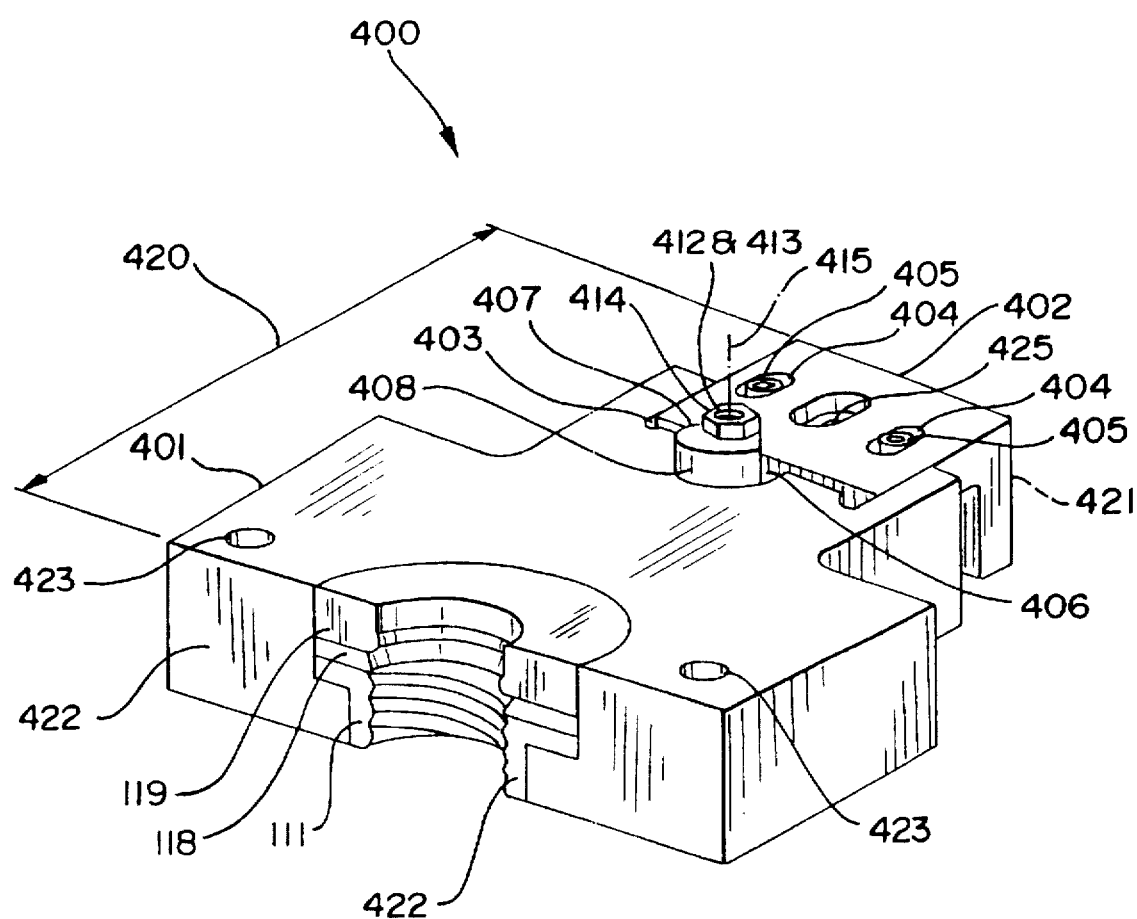
FIG. 4 is a perspective view of an adjustable depth top block according to the present invention.
Figure 5:
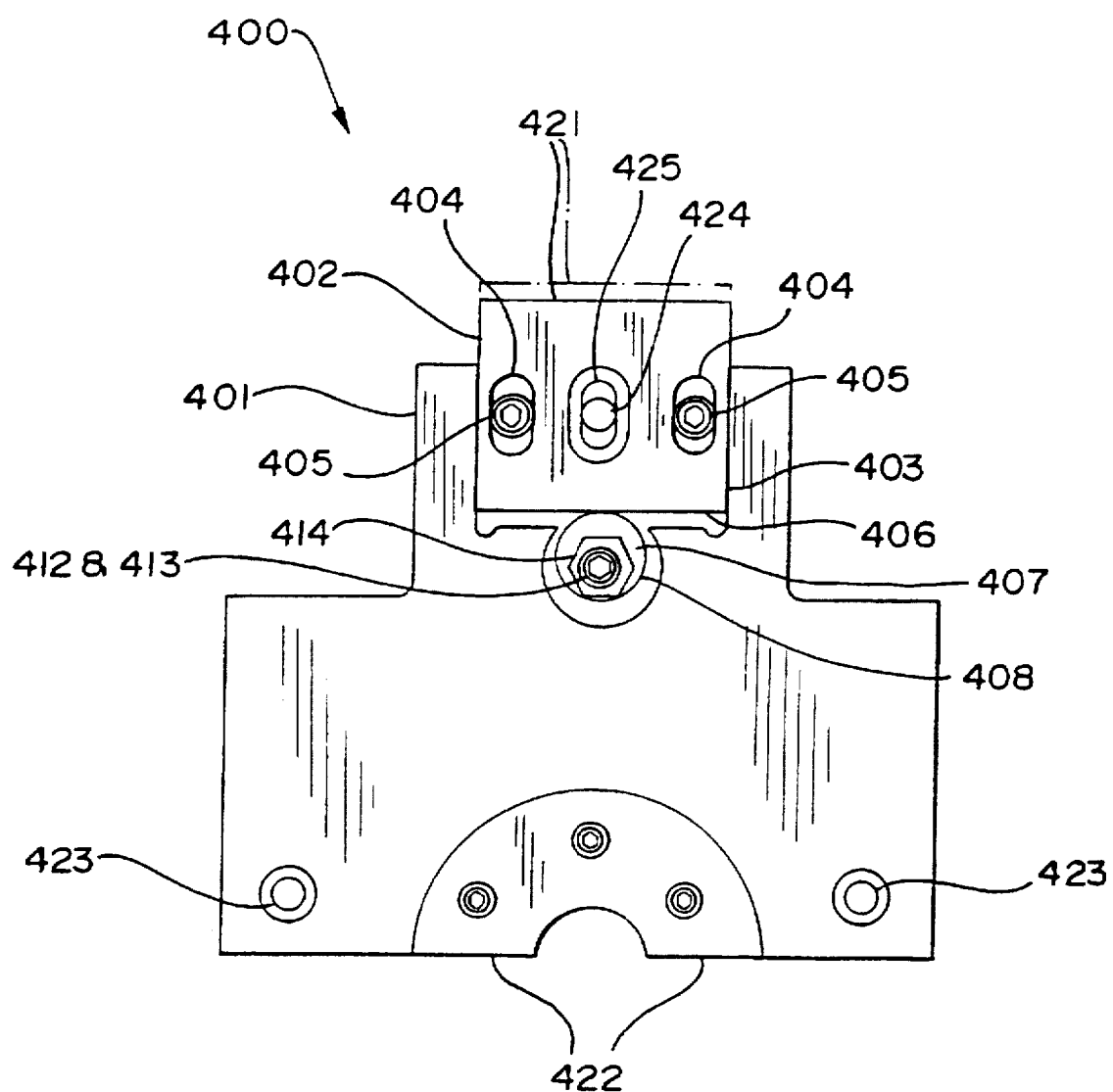
FIG. 5 is a top view of the top block of FIG. 4.
Figure 6:
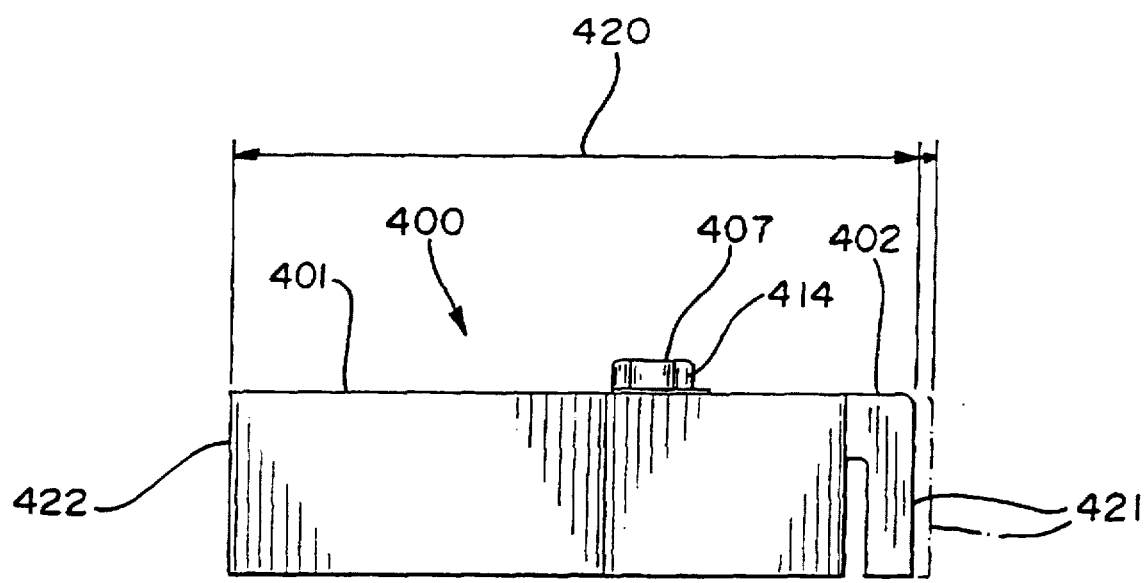
FIG. 6 is a side view of the top block of FIG. 4.
Figure 7:
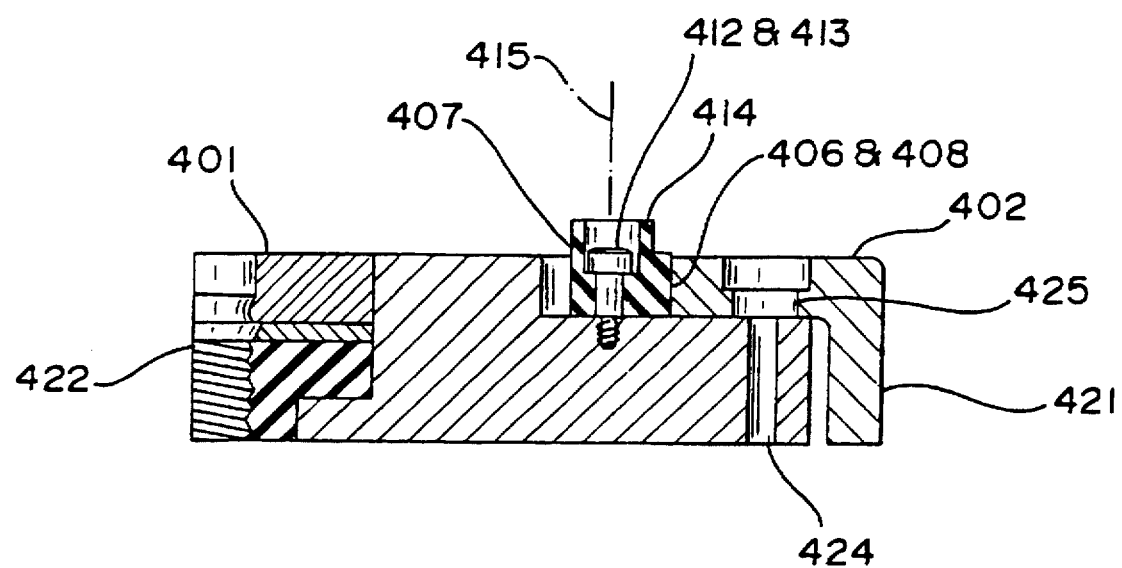
FIG. 7 is a cross-sectional side view of the top block of FIG. 4.
Figure 8:
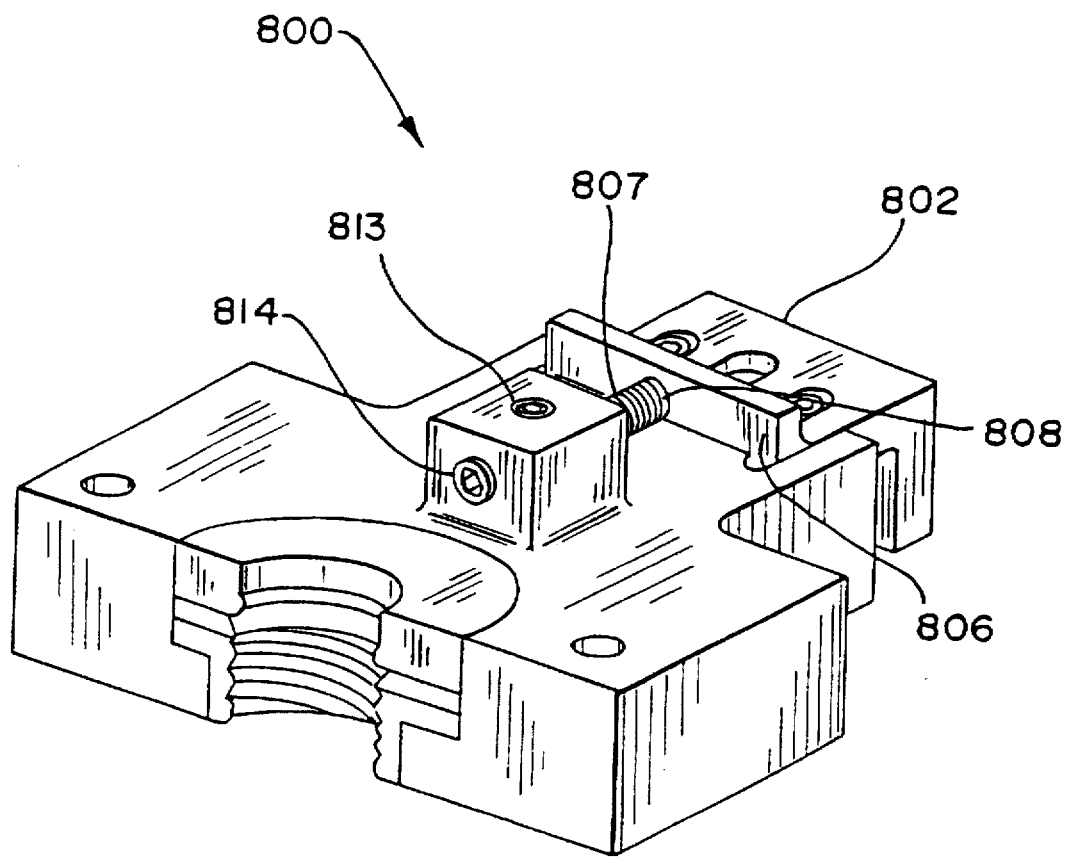
FIG. 8 is a perspective view of another adjustable depth top block according to the present invention.
Figure 9:
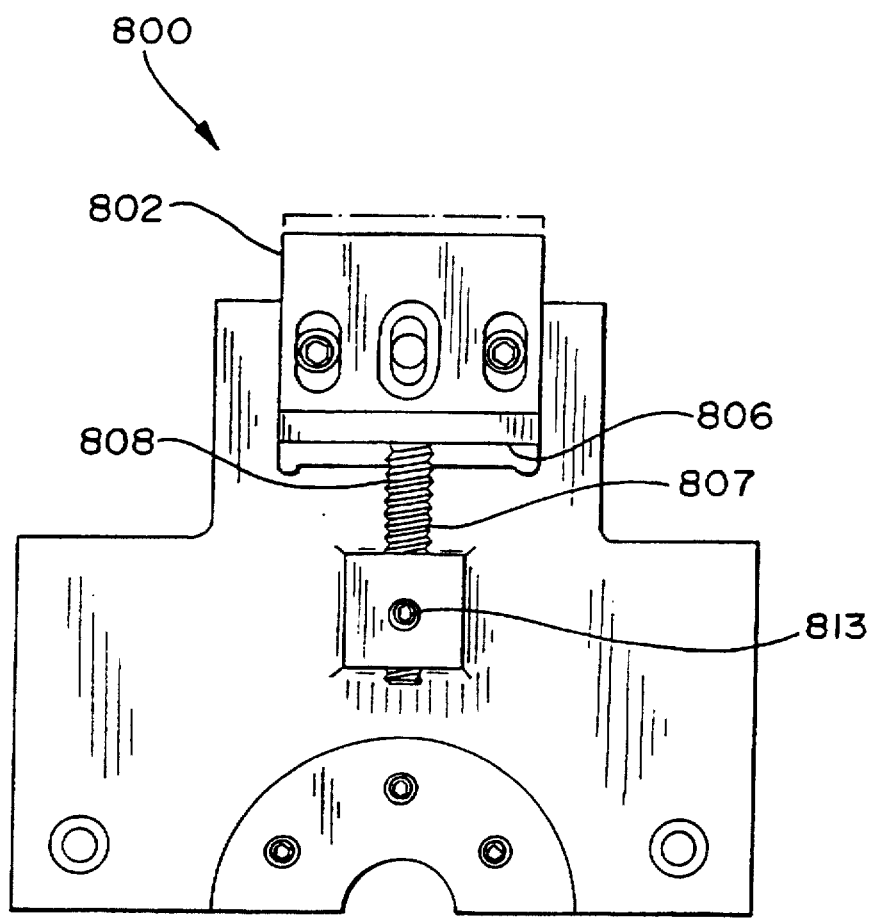
FIG. 9 is a top view of the top block of FIG. 8.
Figure 10:
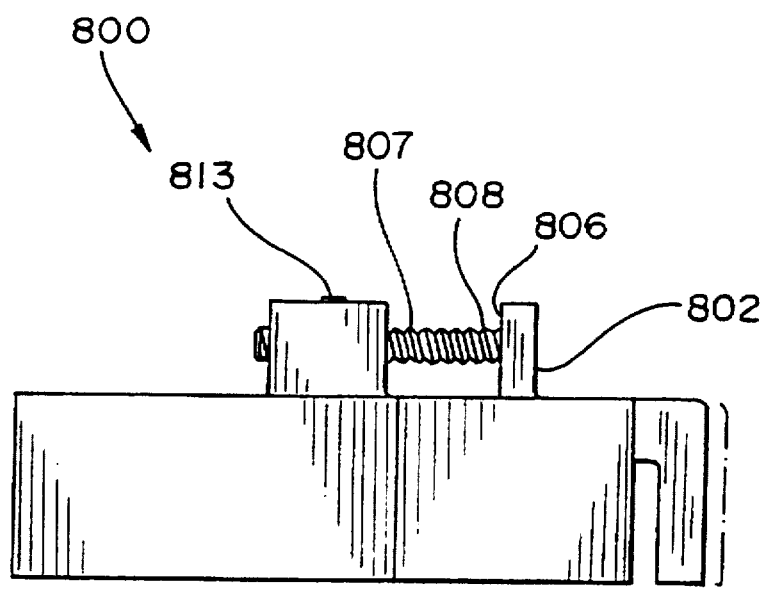
FIG. 10 is a side view of the top block of FIG. 8.
Figure 11:
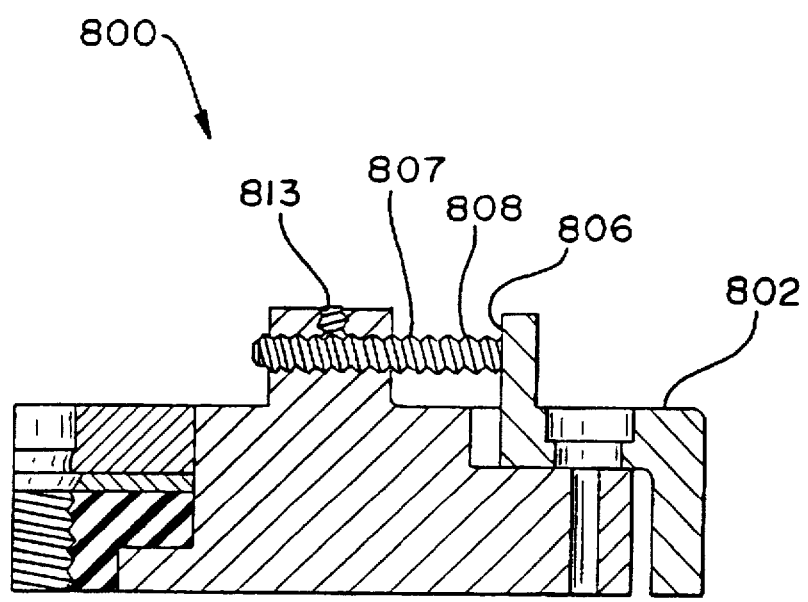
FIG. 11 is a cross-sectional side view of the top block of FIG. 8.
Figure 12:
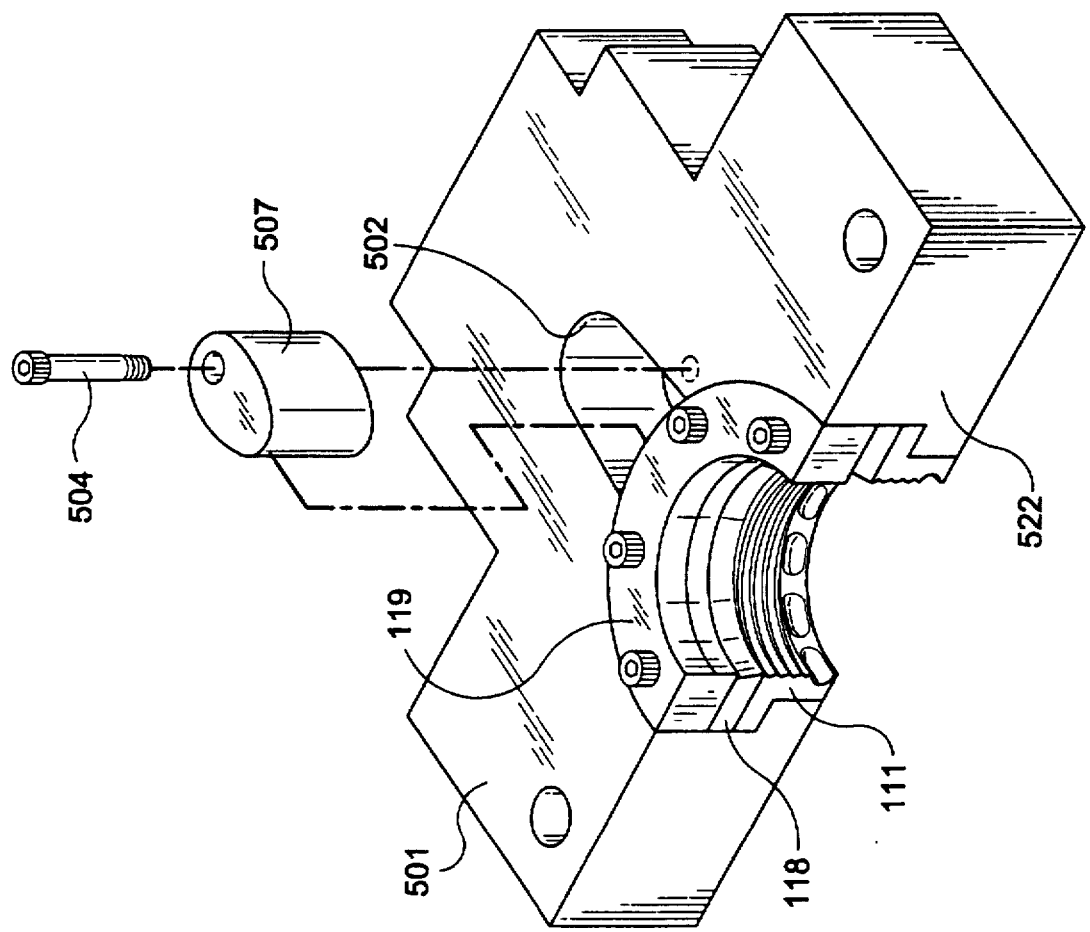
FIG. 12 is a top perspective view of a top block assembly according to an alternative embodiment of the invention.
Figure 13:
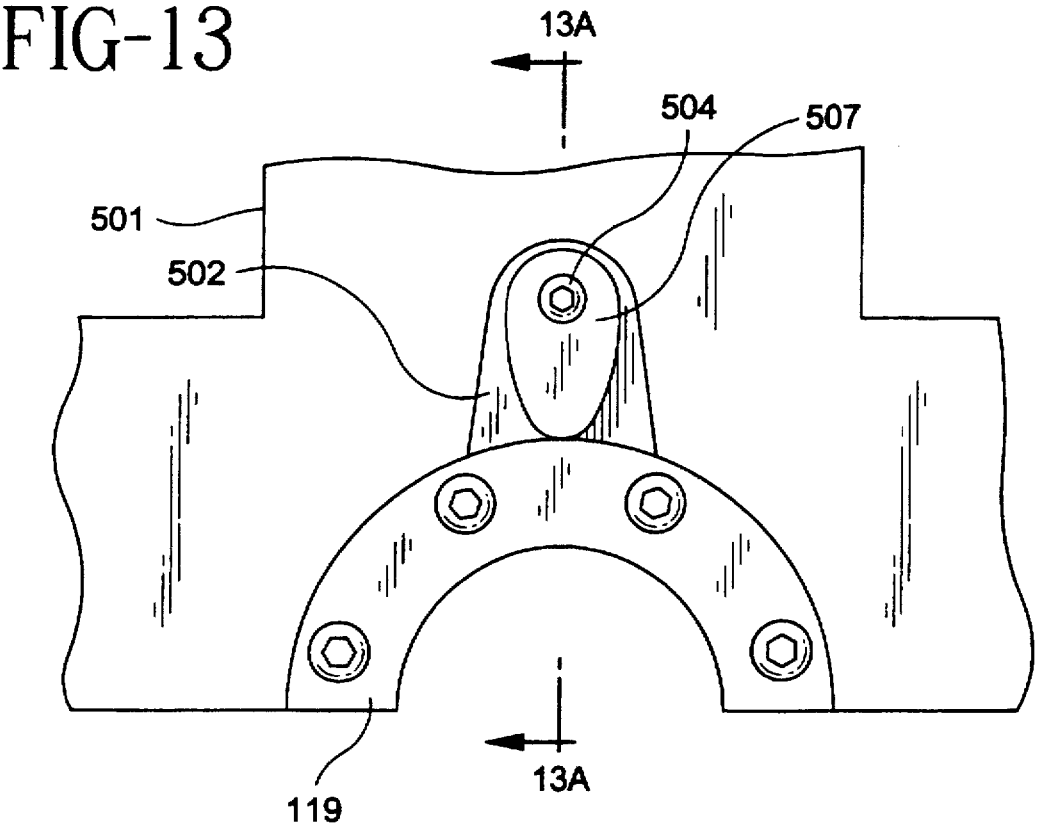
FIG. 13 is a top plan view thereof.
Figure 13A:
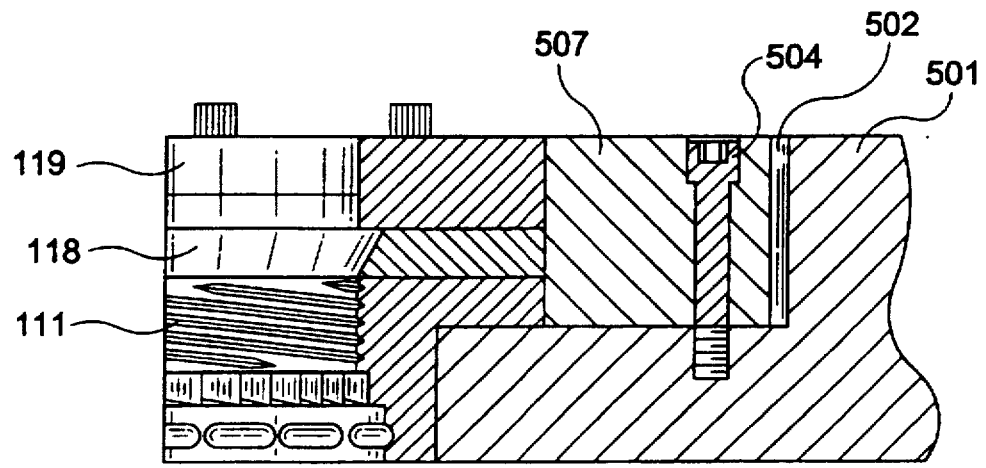
FIG. 13A is a sectional view thereof taken along line 13A—13A of FIG. 13.
Figure 14:
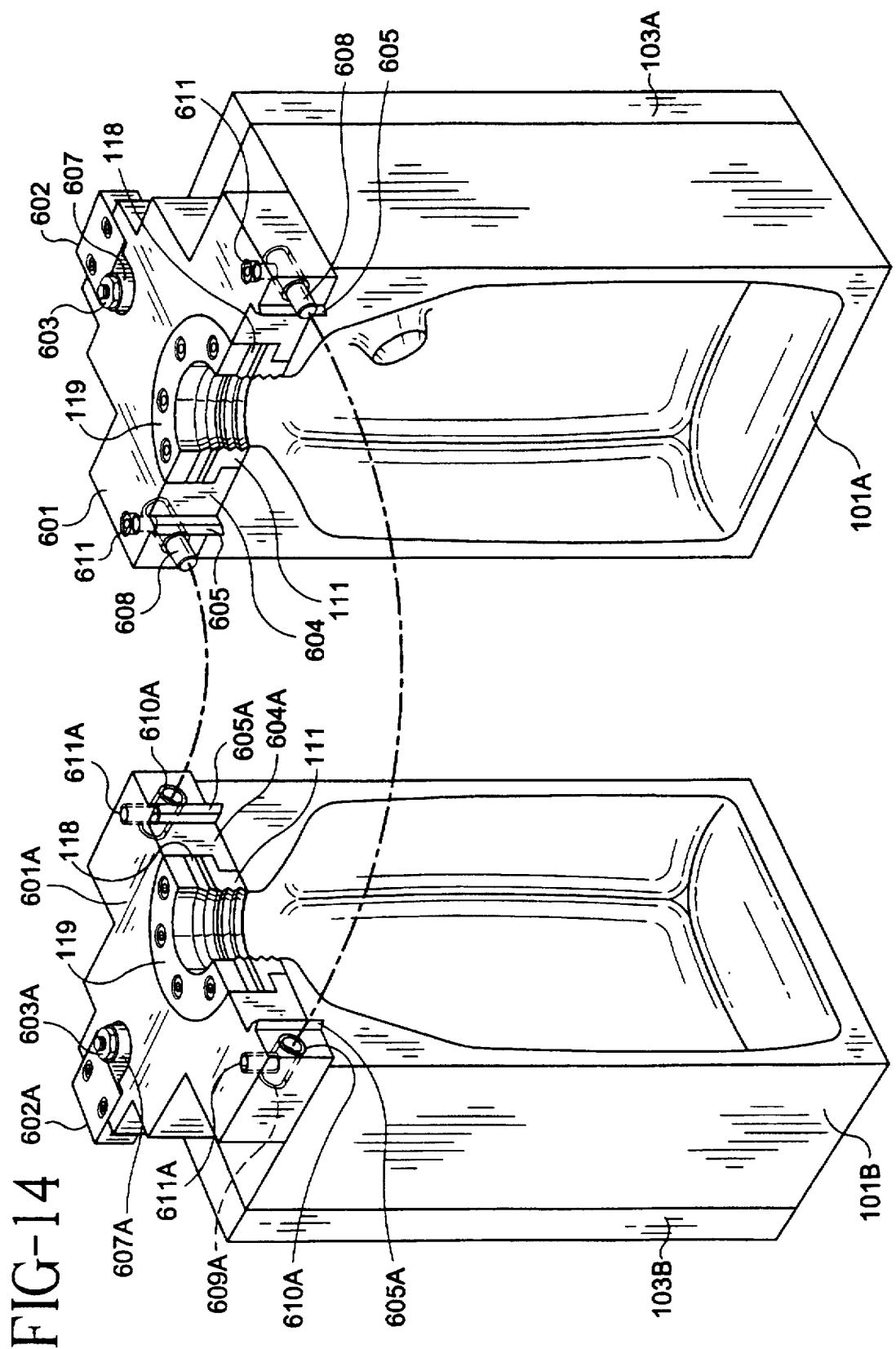
FIG. 14 is a top perspective view of a mold assembly showing an alternative embodiment of the invention.
Figure 16:
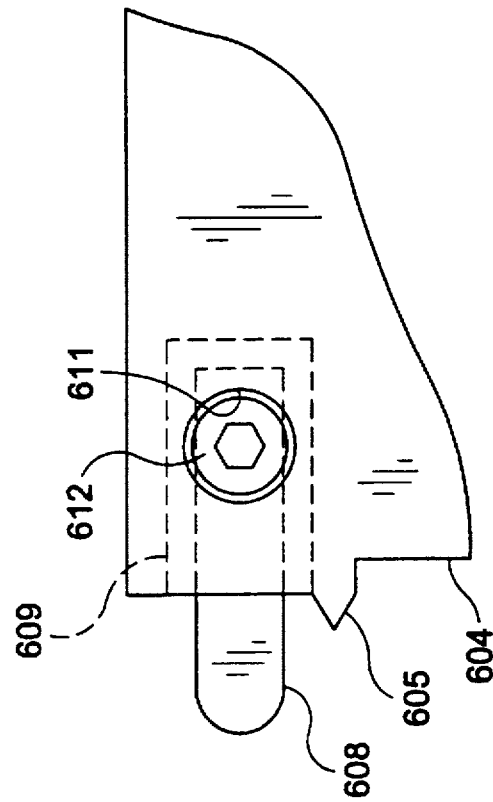
FIG. 16 is an enlarged, partial top plan view thereof.
Figure 15:
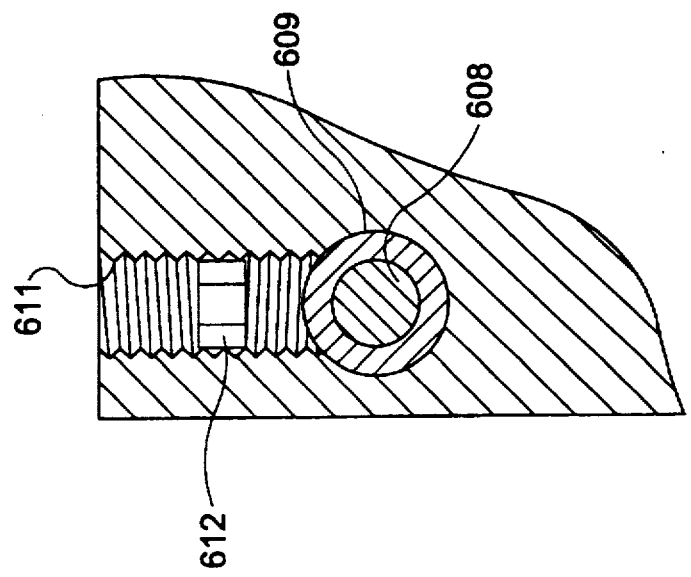
FIG. 15 is a sectional view thereof.

The present invention is best understood by reference to the prior art depicted in FIGS. 1 through 3, a preferred embodiment depicted in FIGS. 4 through 7, a first alternative embodiment depicted in FIGS. 8 through 11, a second alternative embodiment depicted in FIGS. 12, 13 and 13A, and a third alternative (and preferred) embodiment depicted in FIGS. 14–16.

Referring first to the prior art, a typical mold system 100 is comprised of two main mold halves 101A and 101B, two top block halves 102A and 102B, and two back plates 103A and 103B. Main mold half 10A is affixed to back plate 103A which in turn is mounted within an extrusion blow-molding machine. Top block half 102A is affixed atop main mold half 101A by machine bolts 104 through screw-holes 117 such that top block parting face 105 is aligned with main mold parting face 106. The opposing main mold and top block halves are similarly assembled, with further attention that the matching mold halves and top blocks mate properly to each other. Reservoir cavity 107 is formed by the mating of the mold halves such that container 200 may be formed therein.

Container 200 includes reservoir portion 201 and neck portion 202. The neck portion includes helical threading 203 therearound. The mating top block halves form a thread cavity 108 for forming the container neck threading 203 therein. Each top block halve comprises base portion 110, a neck finish insert 111, a shear steel 118, and a master seal 119. The neck finish inserts, shear steels and master seals are removable from the top block halves for interchangeability and replacement.

After assembly and alignment, top block parting face 105 must be precisely aligned with main mold parting face 106 to ensure proper molding and minimal mold wear. In order to accomplish this, top plate depth 112, measured from back mounting surface 113 of the back plate 103A to top block parting face 105, must be equal to main mold depth 114, equivalently measured. Further, the parting faces must each be held parallel to the back plate.

Referring now to FIGS. 4 through 7 and a first preferred adjustable top block assembly 400 of the present invention, movable aluminum heel 402 is attached to aluminum top block base 401 within longitudinal groove 403. The movable heel includes two longitudinal guide-slots 404 and is held within the groove by two heel mounting shoulder screws 405 which allow longitudinal translation of the heel within the groove. The forward face 406 of the movable heel engages rotatable eccentric cam 407 at cylindrical cam surface 408. The cam includes through-hole 412 and is affixed to base 401 by cam mounting shoulder screw 413. Loosening of screw 413 allows rotation of the cam, while tightening locks the cam to deny such.

The cam is adapted such that a wrench may engage external hex feature 414 while a hex driver may engage screw 413. This allows the properly rotated cam to be held in position by a wrench while the screw is tightened, to avoid unintended rotation from the torque of tightening the screw.

The cylindrical cam surface 408 is eccentric about cam axis 415, so that the distance from the axis to the cam surface, or the cam throw, varies about the axis. Rotation of the cam about the axis causes more or less throw by the cam and longitudinally moves the point of engagement of the heel's forward face accordingly. This simultaneously allows longitudinal translation of the heel. Such longitudinal translation causes a variation in the top block depth 420, measured from the heel's tail face 421, transverse the top block, to the parting face 422.

Screw-holes 423 and 424 are positioned in a standard mounting-hole pattern through the base 401 to allow mounting to a standard main mold half. Screw-slot 425 is longitudinally positioned through the heel 402 and about screw-hole 424 to allow a mounting screw to pass through and affix the heel and base simultaneously to a standard main mold half.

Provided with a particular prior art main mold half such as that of FIGS. 2 and 3, the present invention top block and associated top block components 111, 118, 119 may be affixed and properly aligned to the main mold half 101A, with far more tolerance of the actual main mold depth 114.

First, mounting screws are positioned through forward screw-holes 423 and into the main mold half 101A. The main mold parting face 106 and present top block parting face 422 are aligned as required, then the mounting screws are tightened. Cam mounting shoulder screw 413 is loosened and the cam 407 is rotated until the heel's tail face 421 seats snugly against the forward mounting face 115 of the back plate 103A. The cam mounting shoulder screw is now tightened and a mounting screw is positioned through screw-slot 425 and screw-hole 424 and tightened to secure the aligned assembly.

Because clamping forces during molding act to compress the tail end of the top plate towards the parting face, a longitudinal force is transmitted through the heel and acts radially towards the cam axis 415. It is found that a cam having an eccentrically disposed cylindrical cam surface seven-eighths of an inch in diameter and having a total throw, from maximum to minimum, of eighty-thousandths of an inch will adequately avoid forced rotation from such compressive forces, and thereby avoid an inadvertent change in top plate depth during molding.

Referring now to FIGS. 8 through 11, a second adjustable top block 800 according to the invention is presented in which the cam is a threaded lead-screw 807. The lead-screw is adapted with hex socket 814 to accept a hex driver. Locking screw 813 must be loosened to allow rotation of the lead-screw or tightened to deny such rotation. Rotation of the lead-screw varies the longitudinal position of the lead-screw's tail end 808 which engages the forward face 806 of the movable heel 802.

A third embodiment of the invention is shown in FIGS. 12–13. It includes a rotatable cam 507 which bears against the neck finish components 111, 118, 119, thereby allowing the parting faces of these components to be aligned with the parting face 522 of the top block base 501 as well as the parting face of the main mold half 101A with which they are associated. The top block base 501 in this embodiment is provided with a cavity 502 in which the cam 507 is positioned. The cavity 502 adjoins the cavity in which the neck finish components are mounted, and is located along the center line of the top block base 501.

The neck finish components include sets of holes which are aligned with corresponding threaded openings (not shown) in the top block base. Allen cap screws may be used for securing the neck finish components to the base. The cam 507 bears against the rear surfaces of the components. The neck finish components may be moved several thousandths of an inch with respect to the base by rotation of the cam, which is sufficient to ensure proper alignment. An Allen cap screw 504 may be employed to secure the cam to the top block base 501. The assembly shown in FIGS. 4–7 may be modified to include the cam 507.

FIGS. 14–16 show a fourth embodiment of the invention. This is a highly preferred embodiment as it allows the top block assembly to be correctly aligned with the main mold and prevents shifting of the top block assemblies along the parting plane between mold halves. Such shifting can be attributable to factors such as mold face or back plate irregularities, or wear on the main mold leader pins and bushings. If the neck finish components are incorrectly aligned with each other and/or the blow pin, the neck finishes of the plastic containers produced by the mold cannot be effectively capped, and leakage will be a problem. Specifically, if the shear steels are not satisfactorily aligned, the opening in the neck finish will not be round, and the annular valve of a cap applied thereto will not provide a leakproof seal. The assembly shown in FIGS. 14–16 ensures that all neck finish components in both mold halves will be properly aligned with each other each time the mold closes. The shear steels are accordingly able to trim flash in a precise manner, providing a smooth finish capable of forming a good seal with a ring-shaped valve member of a cap. If the neck finish blocks are of the types which include threads, the thread formed on each half of the container neck will be positioned correctly, allowing the corresponding threads of a cap to properly engage those on the container neck.

A top block assembly having the above-described capabilities includes an aluminum top block base 601, a movable heel 602 similar to the heel 402 shown in FIGS. 4–7, and a cam assembly 603 including a rotatable cam 607 which is substantially identical to that shown in FIGS. 4–7. The heel is preferably made from aluminum bronze or stainless steel, though anodized aluminum will perform satisfactorily. The cam assembly and heel allow the parting plane of the top block base 601 and neck finish components 111, 118, 119 to be aligned with the parting planes of the main mold half 101A to which they are mounted. As the structure and operation of the heel and cam assembly are described in detail above with respect to FIGS. 4–7, it is unnecessary to repeat it with respect to the present embodiment.

The top block base 601 includes a face portion including a pair of flash pockets 604 on opposite sides of the neck finish components, one of which is shown in FIG. 16. The outer edge of each flash pocket adjoins an elongate, vertically extending protrusion 605. This protrusion is substantially triangular in cross section, and is referred to as a pinch-off. The portions of the top block base 601 outside each pinch-off are known as the tonnage pad sections. A male alignment pin 608 is secured to each of the tonnage pad sections of one top block base. Each pin may be made from case hardened steel. The ends of the pins are preferably rounded. Each pin 608 is positioned within a steel bushing 609, as shown in FIG. 15. The bushing is located in a horizontal bore 610 extending into the tonnage pad section. A second, threaded bore 611 extends vertically into the top block base 601, and intersects the bore 610. A set screw 612 is positioned within the threaded bore 611, and maintains the bushing and set screw in position. Removal of the set screw allows the bushing and pin to be replaced when worn or damaged. The set screw shown is accessible with an Allen wrench.

Each of the tonnage pad sections of the opposite top block base 601A bore includes a bore 610A and bushing 609A. A second threaded bore 611A intersects this bore, and contains a second set screw 612A which engages the bushing. The bushing, however, contains no alignment pin. Each bushing 609A is aligned with a pin 608 of the opposing top block base. The tolerance between each pin 608 and bushing is preferably between 0.0005–0.002 inches for a one gallon mold. The closing of the mold causes the pins to enter the respective bushings. As the tolerances between pin and bushing diameters are small, there is little opportunity for either top block base to shift in any direction along the parting plane between mold halves. The above-described assembly ensures precise alignment of the neck finish components in all three directions: vertically, horizontally and translationally. Translational alignment is provided by the cam assemblies 603, 603A of the respective top block bases; vertical and horizontal alignment is provided by the pins and bushings.

The ends of the respective alignment pins are rounded to facilitate their entry into the respective bushings. Once the pins are within the bushings, any shifting of the top block bases which might otherwise occur is prevented.

The dimensions of the various components may vary depending upon the sizes of the main molds and associated top block bases. The pins for the top block base of a one gallon mold may be between about ¼ and ⁵⁄₁₆ of an inch in length. The bores defined by the bushings are longer so that the pins to not engage an end wall. The diameters of the pins may be about ⁵⁄₁₆ of an inch.

Tapered bins and bushings may be employed, and have the advantage of providing a centering function. The possibility of top block base shifting may be further reduced or even eliminated in this manner.

Other types of alignment means other than pins and bushings may be employed, though they are not presently preferred. The top block bases may, for example, include integrally formed protrusions and slots similar to the removable pins and bushings described above. While each pin or protrusion is preferably positionable in a bore which is circular in cross section, other pin and bore configurations could be employed to accomplish the desired prevention of shifting of the top block bases horizontally and/or vertically along the parting plane of the mold. The alignment means described herein may be incorporated in any of the top block bodies described above, though the assembly shown in FIGS. 14–16 is highly preferred.

What is claimed is:

1. A mold assembly for forming blow-molded plastic containers, comprising:

a main mold body having a front face;

a cavity defined by said main mold body;

a top block assembly removably mounted to said main mold body, said top block assembly including a top block body having a front face, a neck finish insert mounted to said top block body, said neck finish insert including a front face, a shear steel mounted to said top block body, said shear steel including a front face, and a master seal mounted to said top block body; and a rotatable cam positioned in operative relationship with said top block assembly and mounted to said top block body, whereby rotation of said cam causes a front face of said top block assembly to move with respect to said front face of said main mold body.

2. A mold assembly as described in claim 1, wherein said top block assembly includes a movable heel mounted to said top block body, said rotatable cam being positioned between said heel and said top block body and bearing against said heel.

3. A mold assembly as described in claim 1, wherein said cam bears against said shear steel and said neck finish insert, whereby rotation of said cam causes said front faces of said shear steel and neck finish insert to move with respect to said front face of said top block body.

4. A mold assembly as described in claim 3, wherein said cam bears against said master seal.

5. A mold assembly as described in claim 1 including at least one alignment pin extending from said front face of said top block body.

6. A mold assembly as described in claim 1, wherein said front face of said top block body includes a pair of tonnage pad sections, each of said tonnage pad sections including alignment means for aligning said top block body with a second top block body when said top block body is moved into adjoining relation with said second top block body.

7. A mold assembly as described in claim 1, wherein said top block body includes a top surface, said cam being rotatable about an axis extending substantially perpendicular with respect to said top surface.

8. A mold assembly as described in claim 7 wherein rotation of said cam causes said front face of said shear steel to move with respect to said front face of said main mold body.

9. A mold assembly for forming blow-molded plastic containers, comprising:

first and second main mold bodies, each of said main mold bodies having a front face, said front faces of said main mold bodies being in opposing relation;

a cavity defined by each of said main mold bodies, said cavities being in opposing relation;

first and second top block bodies removably mounted, respectively, to said first and second main mold bodies, each of said top block bodies including a front face, said front faces of said top block bodies being in opposing relation;

first and second heel members mounted, respectively to said first and second top block bodies;

first and second spacing elements mounted, respectively, to said first and second top block bodies and positioned, respectively, between said first and second top block bodies and said first and second heel members;

first and second neck finish inserts mounted to each of said top block bodies, said first and second neck finish inserts being in opposing relation to each other, and alignment means positioned in operative relationship with said first and second top block bodies for ensuring correct orientation of said top block bodies along a plane parallel to said front faces of said top block bodies.

10. A mold assembly as described in claim 9, wherein said alignment means comprise a pair of alignment pins extending from the front face of said first top block body and a pair of bores aligned with said pins and extending within said second top block body.

11. A mold assembly as described in claim 10, wherein said alignment pins are removably secured to said first top block body.

12. A mold assembly as described in claim 10, wherein said pins and said bores have substantially the same cross-sectional dimensions, said bores being defined by bushings mounted within said second top block body.

13. A mold assembly as described in claim 9 wherein said first second spacing elements are comprised, respectively, of first and second rotatable cams bearing, respectively, against said first and second top block bodies.

14. A top block assembly comprising:

a top block body including a front face, a recess extending into said front face, said front face defining a first tonnage pad at one side of said recess and a second tonnage pad at the opposite side of said recess;

a neck finish insert positioned within said recess;

a heel mounted to said top block body and movable with respect thereto;

a first alignment member mounted to said first tonnage pad;

a second alignment member mounted to said second tonnage pad, and a spacing element mounted to said top block body and positioned between said top block body and said heel and maintaining a selected space between said top block body and said heel.

15. An assembly as described in claim 14, wherein said first alignment member is a pin extending substantially perpendicularly from said first tonnage pad.

16. An assembly as described in claim 15 including a bushing extending within said first tonnage pad, said pin being removably mounted to said bushing.

17. An assembly as described in claim 14, wherein said second alignment member is a pin extending substantially perpendicularly from said second tonnage pad.

18. An assembly as described in claim 14, wherein said first alignment member is a female bushing.

19. An assembly as described in claim 14 wherein said spacing element is a rotatable cam positioned between said heel and a portion of said top block body, said cam being engageable with said heel and capable of moving said heel with respect to said top block body.

20. An assembly as described in claim 14 including first and second pinch-offs extending from said front face of said top block body, said first and second alignment members respectively adjoining said first and second pinch-offs.

21. A top block assembly comprising:

a top block base adapted for attachment to a main mold and including a front parting face and a rear end portion;

a neck finish insert mounted to said top block base and adjoining said front parting face;

a heel attached to said top block base, said heel including a forward face and a tail face, said forward face being in opposing relation to said rear end portion of said top block base; and a spacing element mounted to said top block base and positioned between and engaging said forward face of said heel and maintaining a selected spacing between said rear end portion of said top block base and said forward face of said heel.

22. A top block assembly as described in claim 21 including means for allowing said top block base to be mounted to a main mold half.

23. A top block assembly as described in claim 22 wherein said top block base includes a first tonnage pad at one side of said neck finish insert and a second tonnage pad at the opposite side of said neck finish insert, a first alignment pin mounted to said first tonnage pad, and a second alignment pin mounted to said second tonnage pad.

* * * * *

UNITED STATES PATENT AND TRADEMARK OFFICE
CERTIFICATE OF CORRECTION

PATENT NO. : 5,776,518
DATED : July 7, 1998
INVENTOR(S) : E. Wohlgemuth

It is certified that error appears in the above-identified patent and that said Letters Patent is hereby corrected as shown below:

Column 4, Line 65     "Main mold 10A is" should read: --Main mold half 101A is--

Column 5, Line 64     "main mold half IOIA" Should read: --main mold half 101A--

Signed and Sealed this

Fifteenth Day of September, 1998

Attest:

BRUCE LEHMAN

Attesting Officer     Commissioner of Patents and Trademarks